(12) United States Patent
Tramontano (10) Patent No.: US 9,602,878 B2
(45) Date of Patent: Mar. 21, 2017

(54) SYSTEM AND METHOD FOR FACILITATING VIRTUAL COMPETITIONS

(71) Applicant: Virtual Competitions, Inc., Boca Raton, FL (US)

(72) Inventor: Ron Joseph Tramontano, Lake Worth, FL (US)

( * ) Notice: Subject to any disclaimer, the term of this patent is extended or adjusted under 35 U.S.C. 154(b) by 269 days.

(21) Appl. No.: 14/475,123

(22) Filed: Sep. 2, 2014

(65) Prior Publication Data

US 2015/0126259 A1 May 7, 2015

Related U.S. Application Data

(60) Provisional application No. 61/900,166, filed on Nov. 5, 2013.

(51) Int. Cl.
G06F 17/00 (2006.01)
H04N 21/478 (2011.01)
H04N 21/475 (2011.01)

(52) U.S. Cl.
CPC ..... *H04N 21/4781* (2013.01); *H04N 21/4756* (2013.01); *A63F 2300/8052* (2013.01)

(58) Field of Classification Search
USPC .......................................... 463/6–9
See application file for complete search history.

(56) References Cited

U.S. PATENT DOCUMENTS 7,162,433 B1 1/2007 Foroutan
8,162,758 B1 4/2012 Powers
8,224,696 B2 7/2012 Speiser
8,656,298 B2 2/2014 Rose
8,678,932 B2 3/2014 Alman
(Continued)

FOREIGN PATENT DOCUMENTS

KR WO2010008106 1/2010
WO WO0025244 5/2000

OTHER PUBLICATIONS

Contestcentral, Where Contest Come Alive, (website) www.contestcentral.com, Jun. 9, 2014.
(Continued)

*Primary Examiner* — Ronald Laneau
(74) *Attorney, Agent, or Firm* — The Concept Law Group, P.A.; Scott D. Smiley; Yongae Jun (57) ABSTRACT

A method of providing an e-commerce business over a computer network to a brick-and-mortar entity that teaches a physical skill is disclosed. The method includes providing a virtual competition website over a computer network to facilitate a virtual competition of a sport of physical skill. A request is received from a brick-and-mortar entity to participate in an e-commerce business by allowing skill entrants associated with the brick-and-mortar entity to enter the virtual competition and video competition entries are received from the skill entrants associated with the brick-and-mortar entity, each of the video competition entries including video demonstrating a skill entrant's physical skill in the sport. Instructions can be provided at the website for the skill entrants to provide an entry fee for the virtual competition to the brick-and-mortar entity. Winning video competition entries are determined by accumulating views and votes, where only registered users can vote.

15 Claims, 7 Drawing Sheets

(56) References Cited

U.S. PATENT DOCUMENTS

| | | | | |
|---|---|---|---|---|
| 2002/0198050 A1* | 12/2002 | Patchen | ............... | A63F 13/12 |
| | | | | 463/40 |
| 2003/0171982 A1 | 9/2003 | Paul | | |
| 2008/0167947 A1 | 7/2008 | Skinner | | |
| 2011/0066444 A1 | 3/2011 | Fish | | |
| 2011/0166939 A1 | 7/2011 | Junkin | | |
| 2011/0271190 A1 | 11/2011 | Kort | | |
| 2012/0028232 A1* | 2/2012 | Findlay | ............... | G06Q 10/06 |
| | | | | 434/362 |
| 2013/0184082 A1* | 7/2013 | Patchen | ............... | A63F 13/12 |
| | | | | 463/42 |

OTHER PUBLICATIONS

Youtube, Contest Central, (website) www.youtube.com/channel/UCFoLn9xRWIP8cRoIRSTPcfQ, Jun. 9, 2014.
Youtube, Mixed Martial Arts Contest Winnter—Rich Castro, (website) http://www.youtube.com/watch?v=YiFksvdQ6MA, Apr. 9, 2013.
Youtube, Mixed Martial Arts Contest Winner Dustin Bunnel, (website) http://www.youtube.com/watch?v=qrdzvKxqV34, Apr. 9, 2013.
Votigo, Video Contest, (website) http://www.votigo.com/corp/solutions/photo-video.phpgclid=CNLW9fbY474CFcmXvQodsmMAqw, Jun. 9, 2014.

* cited by examiner

SYSTEM AND METHOD FOR FACILITATING VIRTUAL COMPETITIONS

CROSS-REFERENCE TO RELATED APPLICATION

This application claims priority to U.S. Provisional Patent Application No. 61/900,166 filed Nov. 5, 2013, the entirety of which is incorporated by reference.

FIELD OF THE INVENTION

The present invention relates generally to virtual video competitions, and more particularly relates to a method of facilitating a virtual video competition over a computer network between skill entrants enrolled in brick-and-mortar schools that teach a physical skill in order to provide e-commerce solution to the brick-and-mortar school.

BACKGROUND OF THE INVENTION

Brick-and-mortar schools that teach a sport of physical skill, such as martial arts, gymnastics, dance, etc., are well known. Such schools are known for providing many benefits, such as physical strength and agility, self-esteem, and confidence. These schools typically derive revenue primarily from tuition paid for by students or, more particularly, by students' parents. Many schools desire a supplemental source of revenue. Additionally, many schools find it challenging to attract new students. Traditional advertisements, such as flyers, print advertisements in local publications, promotional specials, and the like, are very limited in their reach and effectiveness. What is desired is a method of generating additional revenue sources and additional potential student leads for brick-and-mortar schools. Yet, many owners of such schools are professional instructors/teachers in their respective sport and may know very little about marketing and advertising.

Schools typically register for competitions in which their students are allowed to compete with other students from other schools. These competitions provide students with incentive to develop their skills and win prizes and recognition from their peers. Unfortunately, many competitions are held at physical locations a distance away from the school, requiring students, school personnel, parents, and family members to undergo the inconvenience and costs associated with traveling to the physical location of the competition. State, national, and international competitions are typically held very far distances away from the school. Accordingly, it is often very expensive for the school, as well as the students, to compete in these types of competitions. Schools will often hold fundraisers, such as bake sales and car washes, in order to fund these competitions.

Therefore, a need exists to overcome the problems with the prior art as discussed above.

SUMMARY OF THE INVENTION

The invention provides a virtual competition method that overcomes the hereinafore-mentioned disadvantages of the heretofore-known devices and methods of this general type and that provide brick-and-mortar school owners with an e-commerce source of revenue and student leads, while also allowing them to provide lower cost virtual competitions for students and parents.

With the foregoing and other objects in view, there is provided, in accordance with the invention, a method of facilitating a virtual competition over a computer network is disclosed, where the virtual competition is associated with a sport of physical skill between skill entrants associated with a brick-and-mortar school that teaches said physical skill, for providing e-commerce revenue-generating features to said brick-and-mortar school. The method includes providing a virtual competition website over a computer network operably configured to facilitate a virtual competition of a sport of physical skill; receiving a request from at least one brick-and-mortar school to participate in said virtual competition via the virtual competition website; and receiving a plurality of video competition entries from a plurality of students associated with the at least one brick-and-mortar school, each of the plurality of video competition entries including a video demonstrating a student entrant's physical skill in the sport. A request is sent for a video viewer to communicate video viewer identification information in order for the video viewer to communicate an entry selection input indicating the video viewer's preference for one of the plurality of video competition entries to be a winning video competition entry. The entry selection input is received from the video viewer after receiving the video viewer identification information. The winning video competition entry is determined based on the entry selection input; and the video viewer identification information is communicated to the at least one brick-and-mortar entity.

In accordance with another feature of the present invention, the sport of physical skill is martial arts.

In accordance with a further feature of the present invention, an embodiment includes determining a value representing the total views received by each of the plurality of video competition entries; and determining the winning video competition entry by comparing the total views received for each of the plurality of video competition entries, and the entry selection inputs received from video viewers for each of the plurality of video competition entries.

In accordance with a further feature, an embodiment of the present invention includes determining a value representing the total views received by each of the plurality of video competition entries; and determining the winning video competition entry by adding, for each of the plurality of video competition entries, the value representing the total views received, and the entry selection inputs received from video viewers. Each of the entry selection inputs are weighted more than each of the total views received for calculating a score that determines the winning video competition entry.

In accordance with another feature, an embodiment of the present invention also includes providing instructions for students to provide an entry fee for the virtual competition to the at least one brick-and-mortar school.

In accordance with yet another feature of the present invention, the virtual competition is a competition between students enrolled a single brick-and-mortar school; and the method further includes providing instructions for students to provide an entry fee for the virtual competition to the single brick-and-mortar school.

In accordance with another feature of the present invention, the virtual competition is a competition between students enrolled in different brick-and-mortar schools, where each video competition entry represents the brick-and-mortar school in which the student entrant is enrolled.

In accordance with a further feature of the present invention, an embodiment further includes displaying each of the plurality of video competition entries via the virtual competition website within a graphical background resembling a three-dimensional theater.

In accordance with another feature of the present invention, an embodiment includes displaying at least one of the plurality of video competition entries via the virtual competition website with an advertisement for a sponsor of the video competition.

In accordance with yet another feature of the present invention, an embodiment includes displaying each of the plurality of video competition entries via the virtual competition website within a graphical background, the graphical background resembling a three-dimensional theater, and including an advertisement for a sponsor of the video competition.

In accordance with another feature of the present invention, an embodiment includes providing a plurality of virtual competition events via the virtual competition website, where each of the plurality of virtual competition events is a virtual competition within a predetermined sub-category of the sport.

In accordance with another feature, an embodiment of the present invention also includes providing at least one avatar via the virtual competition website, the at least one avatar operable to provide a predetermined audio-video monologue configured to instruct participation in the virtual competition by at least one of a brick-and-mortar school; a member, the member being a video viewer that communicated video viewer identification information, and created a username and a password associated with an account; a student entrant; a competition judge; and a potential sponsor.

In accordance with the present invention, a method is disclosed of facilitating a virtual competition over a computer network, where the virtual competition is associated with a sport of physical skill between skill entrants associated with a brick-and-mortar entity, for providing e-commerce revenue-generating features to said brick-and-mortar entity. The method includes providing a virtual competition website over a computer network operably configured to facilitate a virtual competition of a sport of physical skill; receiving a request from at least one brick-and-mortar entity to participate in said virtual competition via the virtual competition website; and receiving a plurality of video competition entries from a plurality of skill entrants associated with the at least one brick-and-mortar entity, each of the plurality of video competition entries including a video demonstrating a skill entrant's physical skill in the sport of physical skill. Identification information associated with a video viewer is received. As a result of receiving the identification information, an entry selection input is received from a video viewer, the entry selection input indicating the video viewer's preference for one of the plurality of video competition entries to be a winning video competition entry. The winning video competition entry is determined based on the entry selection input.

In accordance with another feature, an embodiment of the present invention also includes providing instructions for skill entrants associated with the at least one-brick-and-mortar entity to provide an entry fee for the virtual competition to the at least one brick-and-mortar entity as an e-commerce revenue-generating feature for the at least one brick-and-mortar entity.

In accordance with the present invention, a method is disclosed of providing an e-commerce business over a computer network to an organization associated with a physical skill, the method including providing a virtual competition website over a computer network operably configured to facilitate a virtual competition of a sport of physical skill; receiving a request from at least one organization associated with the sport of physical skill to participate in an e-commerce business by allowing skill entrants associated with the at least one organization to enter the virtual competition; and receiving a plurality of video competition entries from the skill entrants associated with the at least one organization, each of the plurality of video competition entries including video demonstrating a skill entrant's physical skill in the sport. Instructions are provided for the skill entrants associated with the at least one organization to provide an entry fee for the virtual competition to the at least one organization; and the winning video competition entry is determined.

In accordance with yet another feature, an embodiment of the present invention includes requesting that a video viewer communicate video viewer identification information in order for the video viewer to communicate an entry selection input indicating the video viewer's preference for one of the plurality of video competition entries to be a winning video competition entry; receiving the entry selection input from the video viewer after receiving the video viewer identification information; and communicating the video viewer identification information to the at least one organization.

In accordance with another feature, an embodiment of the present invention includes receiving entry fee payments from the skill entrants over the computer network; and transferring at least a portion of the entry fee payments to the organization associated with the skill entrants.

In accordance with a further feature of the present invention, an embodiment includes providing a back-end administrator interface associated with the virtual competition website, the back-end administrator interface allowing an administrator to selectively choose a method of determining the winning video competition.

Although the invention is illustrated and described herein as embodied in a virtual competition method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient method for providing an e-commerce solution to brick-and-mortar schools that teach a sport of physical skill, such as martial arts, dance, gymnastics, and the like. Embodiments of the invention provide a website that facilitates virtual video competitions, where students can submit short videos demonstrating their skills in the particular sport. In embodiments of the invention, winners are selected based on the total number of views of the video and the total votes. In one embodiment, video viewers are required to input identification information via the website in order to vote, encouraging students to solicit family members and friends to register to vote for their video. In addition, embodiments of the invention provide the brick-and-mortar schools with a list of the identification information generated during the competition from voters, as a potential student lead source. The potential student leads generated in accordance with the present invention would provide particularly high quality leads, because there is a relatively good chance that friends and family members of students, presumably sharing similar likes and activities, would be interested in also becoming a student and; also are likely to reside within the same area as the school, or, at least, within an area of another school that is registered with the website. In some embodiments, entry fees for the student competitors are paid directly to the brick-and-mortar school, as an additional revenue source for the school. In this manner, competition fees can be directed away from competition hosting entities, which are typically separate from the school, and, instead, be directed towards supporting the brick-and-mortar school itself.

Figure 1:
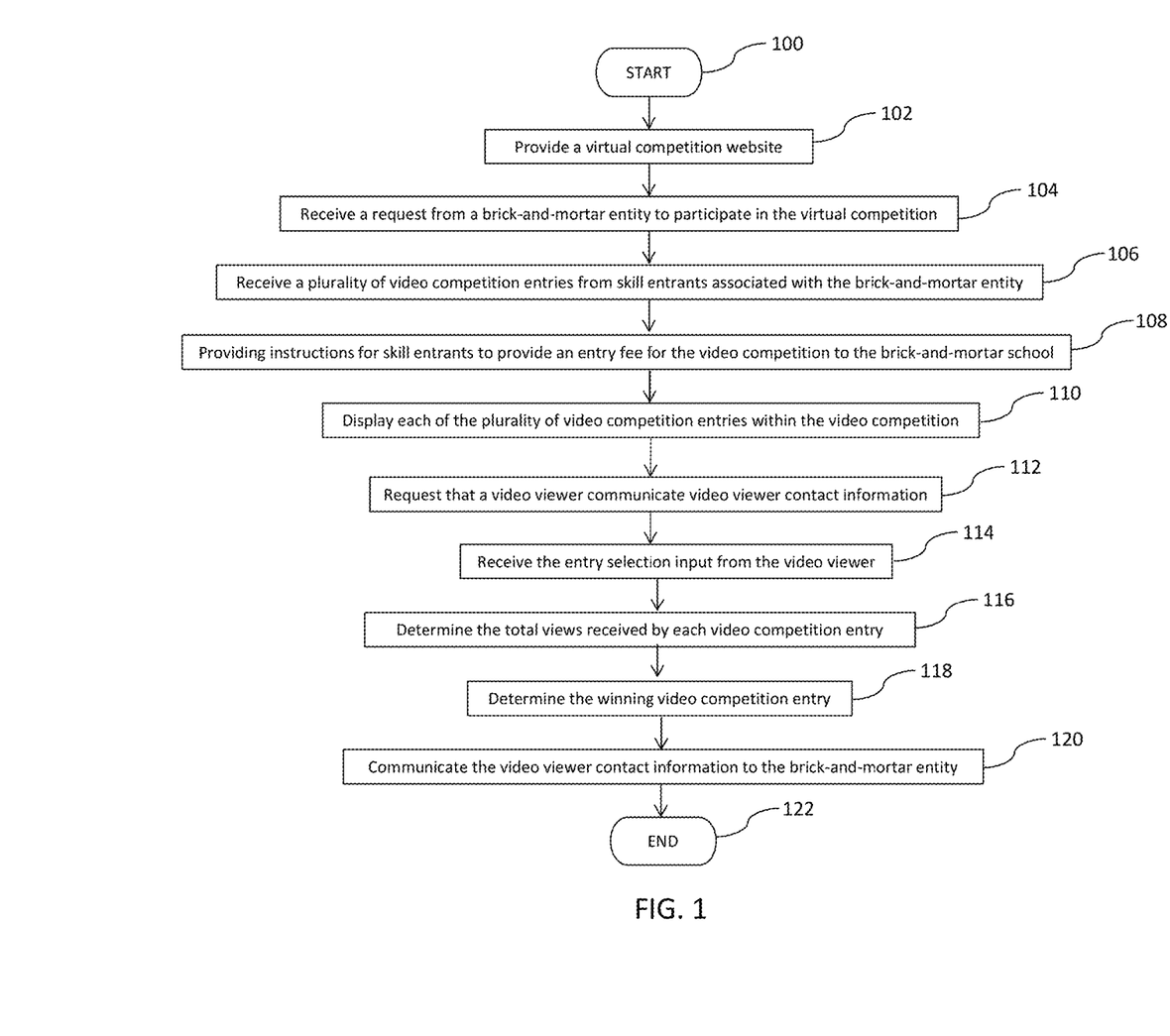
FIG. 1 is a flow chart of an exemplary method of facilitating virtual competitions in accordance with the present invention.

Referring now to FIG. 1, one embodiment of the present invention is shown in a flow chart. FIG. 1 shows several advantageous features of the present invention, but, as will be described below, the invention can be provided in several shapes, sizes, combinations of features and components, and varying numbers and functions of the components.

The following figures will be described in conjunction with the process flow chart of FIG. 1. The process of FIG. 1 begins at step 100 and moves directly to step 102, where a virtual competition website is provided over a computer network operably configured to facilitate a virtual competition of a sport of physical skill. As used herein, the term "sport of physical skill" is defined as an activity involving physical exertion and skill in which an individual or a team can compete against one another. As used herein, the term "virtual competition" is intended to indicate any competition where physical skill is demonstrated by a competitor using software. In one embodiment, the sport of physical skill is martial arts. In other embodiments, the sport of physical skill can be dance, gymnastics, mixed martial arts, and the like.

Figure 2:
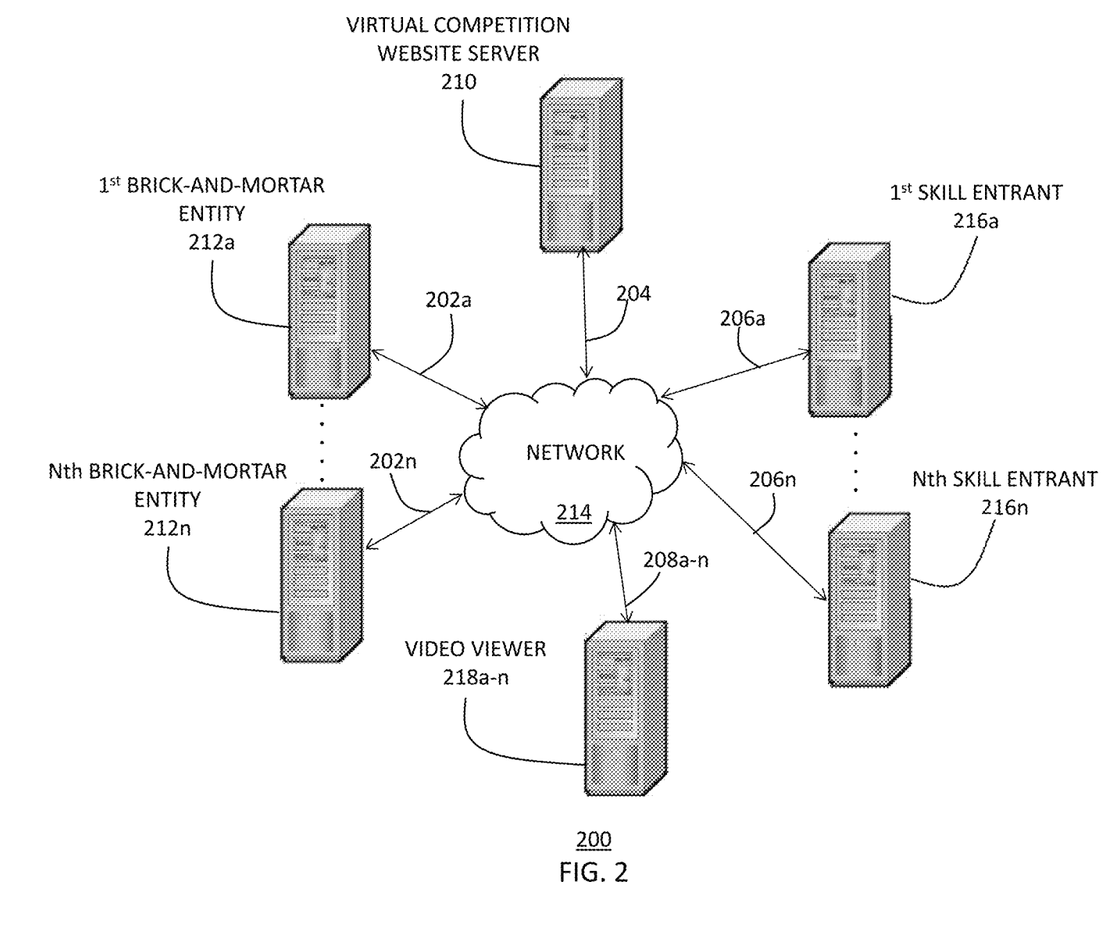
FIG. 2 is a block diagram of an exemplary network operable to carry out the method of FIG. 1 in accordance with the present invention.

Referring now primarily to FIG. 2, one embodiment of a computer network 200 operable to implement process steps of the present invention is illustrated in a block diagram. In one embodiment of the present invention, the virtual competition website is hosted on at least one computer server 210 and is accessible via a network 214, such as the Internet, by a multitude of devices communicatively coupled to the network 214. A plurality of computers associated with brick-and-mortar entities 212a-n may be communicatively coupled to the network 214, where the number of brick-and-mortar entities 212 between "a" and "n" can be any number. For the sake of brevity, the phrase "brick-and-mortar entity" is used to identify elements 212a-n in FIG. 2;

however, as would be recognized by a person of ordinary skill in the art, elements 212a-n, as used in FIG. 2, are computers located at or otherwise operable by persons associated with the brick-and-mortar entities. The plurality of brick-and-mortar entities 212a-n are communicatively coupled to the network 214 via communication links 202a-n, where the number of communication links 202 between "a" and "n" can be any number. In some embodiments, the communication links 202a-n may be wired communication links. In other embodiments, the communication links 202a-n are wireless communication links.

Also, communicatively coupled to the network 214 are a plurality of computers associated with skill entrants 216a-n, where the number of skill entrants 216 between "a" and "n" can be any number. As used herein, the term "skill entrant" is defined as a competitor that enters the virtual competition via the virtual competition website. For the sake of brevity, the phrase "skill entrant" is used to identify elements 216a-n in FIG. 2; however, as would be recognized by a person of ordinary skill in the art, elements 216a-n, as used in FIG. 2, are computers associated with individual skill entrants. The plurality of skill entrants 216a-n are communicatively coupled to the network 214 via communication links 206a-n, where the number of communication links 202 between "a" and "n" can be any number. In some embodiments, the communication links 206a-n may be wired communication links. In other embodiments, the communication links 206a-n are wireless communication links.

Yet another group of devices communicatively coupled to the virtual website server 210 via the network 214 is a plurality of computers associated with video viewers 218a-n. Video viewers are individuals that attempt to view at least one competition video entry. In some embodiments, the video viewers are not students associated with the brick-and-mortar entities 212, but are friends, associates, and family members of such students, which may be potential lead sources for the brick-and-mortar entities 212. For the sake of brevity, the phrase "video viewer" is used to identify elements 218a-n in FIG. 2; however, as would be recognized by a person of ordinary skill in the art, elements 218a-n, as used in FIG. 2, are computers associated with individual video viewers. The plurality of video viewers 218a-n are communicatively coupled to the network 214 via communication links 208a-n, where the number of communication links 202 between "e" and "k" can be any number. In some embodiments, the communication links 208a-n may be wired communication links. In other embodiments, the communication links 208a-n are wireless communication links.

The virtual competition website server 210 hosts the virtual competition website, such that web pages of the website are accessible by brick-and-mortar entities 212a-n, skill entrants 216a-n, and video viewers 218a-n, via the network 214, for participating in the virtual competition by, for example, submitting video entries, registering for video competitions, viewing videos, inputting identification information, and voting for winning video entries. The virtual competition website server 210 is communicatively coupled to the network 214 via a communication link 204. In some embodiments, the communication link 204 may be a wired communication link. In other embodiments, the communication link 204 is a wireless communication link.

Figure 3:
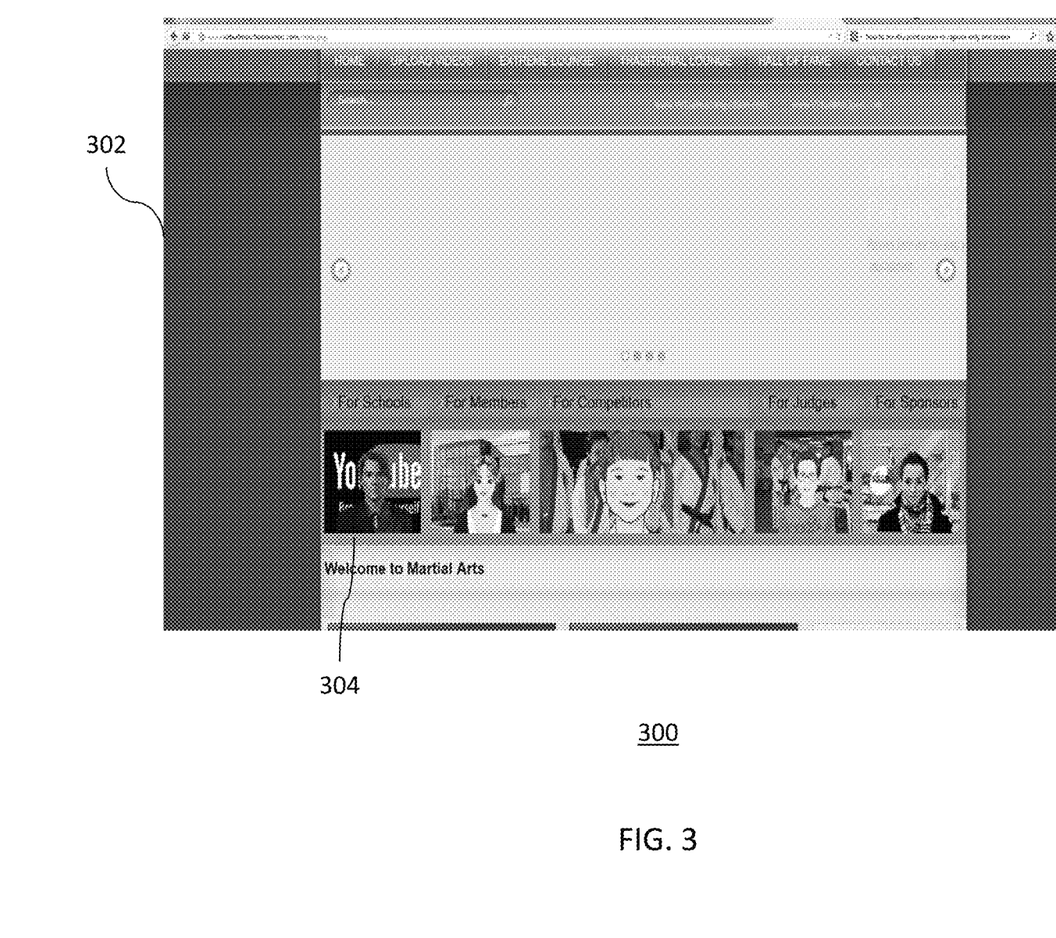
FIG. 3 is a screenshot of an exemplary website operable to facilitate virtual competitions in accordance with the present invention, illustrating use of avatars to explain the inventive method of FIG. 1.
Figure 4:
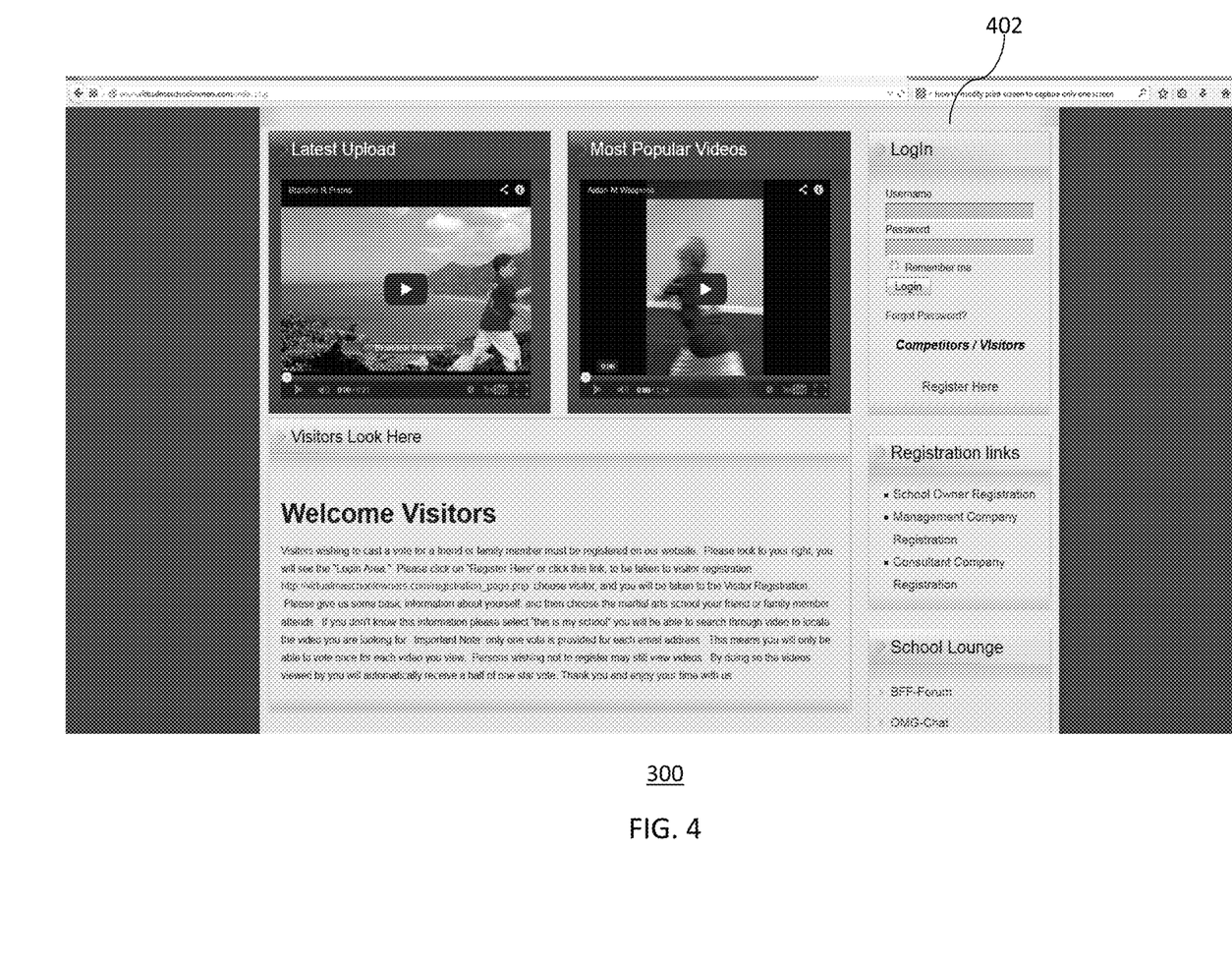
FIG. 4 is a screenshot of the exemplary website of FIG. 3, illustrating a log-in screen in accordance with the present invention.

An exemplary home page 302 of the presently inventive website 300 is illustrated in FIG. 3. The exemplary website 300 is presented as a martial arts competition website; however, unless otherwise indicated, the present invention is not intended to be limited to competitions in the sport of martial arts. For example, in other embodiments, the website 300 can be implemented as a dance competition website, or a gymnastics competition website. In one embodiment, at least one avatar 304 is presented at the virtual competition website 300. In a further embodiment, the avatar 304 is operable to provide a predetermined message to instruct participation in the virtual competition. In one embodiment, the predetermined message is an audio-video monologue. In yet another embodiment, each avatar 304 is configured to provide instructions tailored for: the brick-and-mortar school, a member of the website 300, a student skill entrant, a competition judge, and a potential advertisement sponsor. In one embodiment, the member is a video viewer that communicated his or her identification information and created a username and a password for a user account associated with the website 300. FIG. 4 illustrates an exemplary log-in area 402, where users can enter their username and corresponding password to access their account. Identification information can include a first and a last name, an email address, a physical address, a telephone number, and the like. Providing avatars 304 on the home page 302 is a convenient way to engage potential participants, while instructing them on how to take advantage of the website 300. Potential participants visiting the website 300 can identify with a particular avatar 304 and activate the avatar 304, by, for example, clicking on the avatar 304, in order to receive the audio-visual instruction monologue about the website's 300 features.

In step 104, a request is received from at least one brick-and-mortar entity 212 to participate in the virtual competition via the virtual competition website 300. As used herein, the term "brick-and-mortar" is defined as an organization or business offering services or products via a physical building or other structure, as opposed to an e-commerce organization or business offering services or products via a virtual presence on a distributed computer network, such as the Internet. In other embodiments, the website 300 can facilitate virtual competitions for organizations associated with a sport of physical skill, such as a sports league, or a sports team associated with a sports league. In one embodiment, the brick-and-mortar entity 212 registers to allow their students or members to compete on the website 300 by creating an account associated with the brick-and-mortar entity 212. An individual associated with the brick-and-mortar entity 212 can input information, such as the name, address, phone number, and email address of the brick-and-mortar entity 212 via the website 300. The virtual competition website server 210 can save such information to a database and create an account for the brick-and-mortar entity 212. The brick-and-mortar entity 212 can input a username and password associated with the account. Accordingly, when students and members submit competition entries, they can associate themselves with a corresponding brick-and-mortar entity 212 by selecting the entity 212 via, for example, a drop down selection menu on the website 300. The virtual competition website server 210 can use the information stored in the database to automatically email and/or mail a list of video viewer identification information to the entity 212 after the virtual competition is complete.

Figure 5:
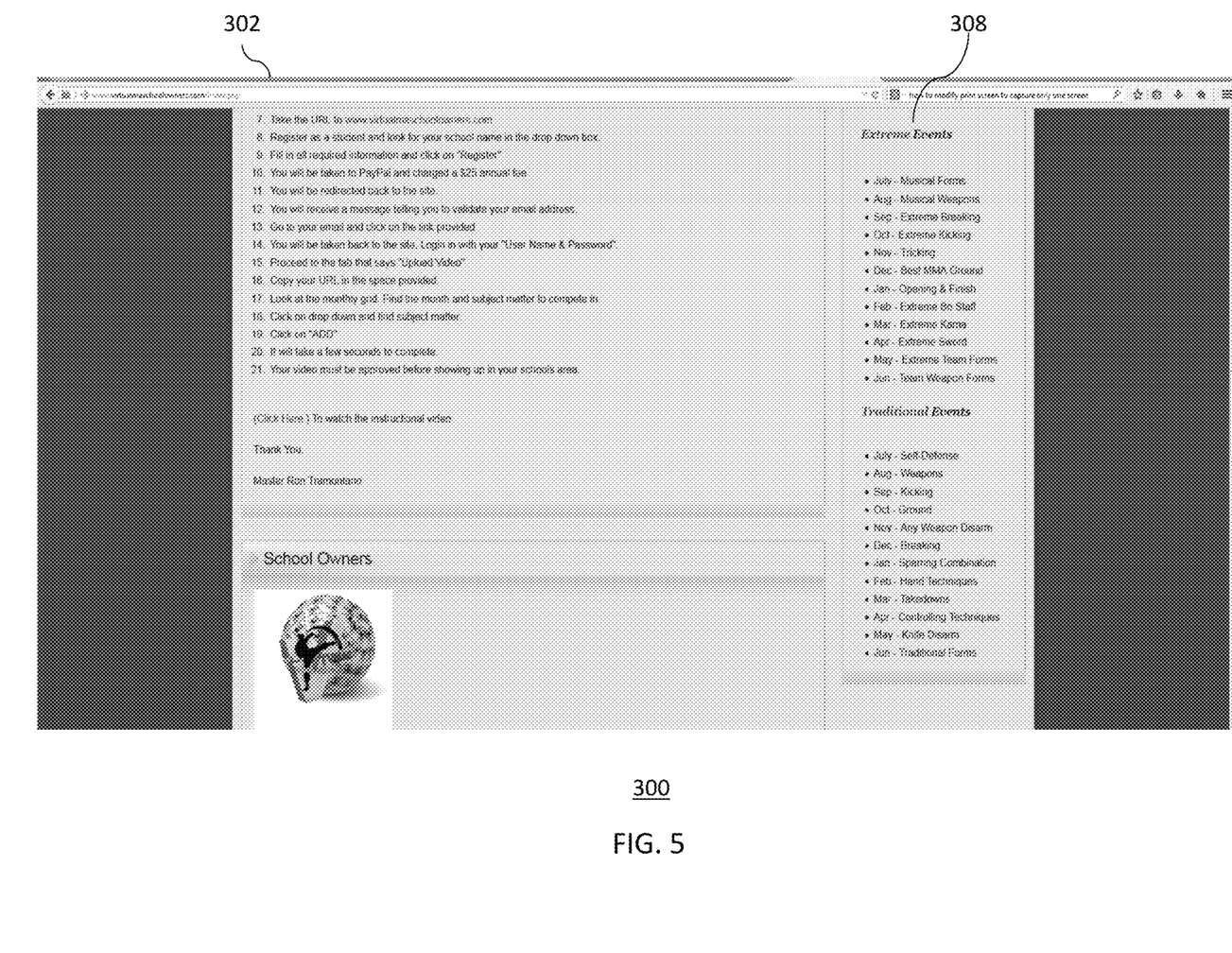
FIG. 5 is a screenshot of the exemplary website of FIG. 3, illustrating organization of a plurality of competition events, in accordance with the present invention.

In step 106, a video competition entry is received from a skill entrant 216 associated with at least one brick-and-mortar entity 212. In some embodiments, the brick-and-mortar entity 212 is a school and the skill entrant 216 is a student thereof. In other embodiments, the brick-and-mortar entity 212 can be a church or gym, where the skill entrants 216 are members thereof. The video competition entry includes video demonstrating the skill entrant's 216 physical skill in a particular sport competition category, or subcategory. In one embodiment, the virtual competition website 300 provides a plurality of virtual competition events, where each of the plurality of virtual competition events is a virtual competition within a predetermined sub-category of the sport. FIG. 5 illustrates a portion of the homepage 302 that describes an exemplary method of organizing various virtual competition events into categories and sub-categories. In the exemplary embodiment, virtual competition events are divided into two categories: extreme martial arts virtual competitions and traditional martial arts virtual competitions. Each month, a particular sub-category of competitions are hosted by the website 300. This provides variety and facilitates focused training opportunities for skill entrants 216. In one embodiment, the virtual competition is a competition between skill entrants 216 associated with a single brick-and-mortar entity 212. For example, the virtual competition can be a competition between students enrolled in a single brick-and-mortar school. In alternative embodiments, the virtual competition is a competition between skill entrants 216 associated with different brick-and-mortar entities 212, where each skill entrant 216 represents his or her brick-and-mortar entity 212. In yet other embodiments, skill entrants 216 are from different countries and each skill entrant 216 represents his or her country in the virtual competition. In some embodiments, the virtual competition video entries are required to be no longer than a predetermined time period, such as, for example, four minutes. In one embodiment, skill entrants 216 are required to create, or if they already have an account, log-in to the account prior to submitting a video entry. FIG. 4 illustrates an exemplary log-in page 306, where users can enter their username and corresponding password to access their account.

In one embodiment, skill entrants 216 are required to pay an annual fee for use of the website 300 to participate in virtual competitions. In other embodiments, skill entrants 216 associated with a brick-and-mortar entity 212 can pay an entry fee for a selected virtual competition event directly to the corresponding brick-and-mortar entity 212. Advantageously, this provides brick-and-mortar entities 212 with an additional revenue-generating feature, allowing such entities 212 to conveniently utilize an e-commerce business solution, without having to: create their own website, maintain and manage the website and associated database(s), and pay to have the website hosted. In fact, some embodiments of the presently inventive method allow for very little or no cost to the brick-and-mortar entities 212 themselves. In one embodiment, skill entrants 216 pay an annual fee to use the website 300 to participate in competitions and pay an entry fee for each virtual competition directly to the brick-and-mortar entity 212 that they are associated with. In this embodiment, the brick-and-mortar entities 212 pay no costs or fees, and the website 300 is funded by annual fees paid by skill entrants 216. Students typically pay entry fees for competitions held at physical locations. With the inventive method, such competition fees can be directed away from physical competition hosting entities, which are typically separate from the school, and, instead, be directed towards supporting the brick-and-mortar entity 212.

In step 108, the virtual competition website 300 can provide instructions for students to provide the entry fee for the selected virtual competition event directly to the brick-and-mortar entity 212. In one embodiment, students can pay schools with cash, check, credit card, debit card, or any other payment options normally used to pay tuition. In alternative embodiments, the website 300 can include a web page that accepts electronic payments over the computer network. In one embodiment, entry fee payments from the skill entrants 216 can be received over the computer network and at least a portion of such entry fee payments can be transferred to the brick-and-mortar entity 212 associated with the skill entrants 216.

In another embodiment, video competition entries are submitted at a separate website, such as www.Youtube.com, where user-generated videos can be uploaded and hosted by a separate server and accessible via a separate domain. In this embodiment, video competition entries can be received from the skill entrant 216 by associating the uploaded video with the virtual competition website server 210, by, for example, copying and pasting the Universal Resource Locator (URL) of the uploaded video into a field provided by the website 300 that associates the uploaded video with the skill entrant's 216 account. In another embodiment, video competitions entries are pre-screened prior to being accessible by video viewers. In yet another embodiment, the video competition entries can be stored in the database associated with the virtual competition website server 210.

In step 110, preferably after the video competition entries have been pre-screened for appropriate content, the website 300 is operable to display the video competition entries. In one embodiment, each brick-and-mortar entity 212 can view video competition entries submitted by skill entrants 216 associated with the corresponding brick-and-mortar entity 212. In other embodiments, all video competition entries are viewable by anyone with an account. The video competition entries can be sortable by any criteria, such as, for example, a school, a category, a month, etc. In one embodiment, the video competition entries can be viewed by clicking on an icon or hyperlink configured to play the selected video competition entry within the website 300.

Figure 6:
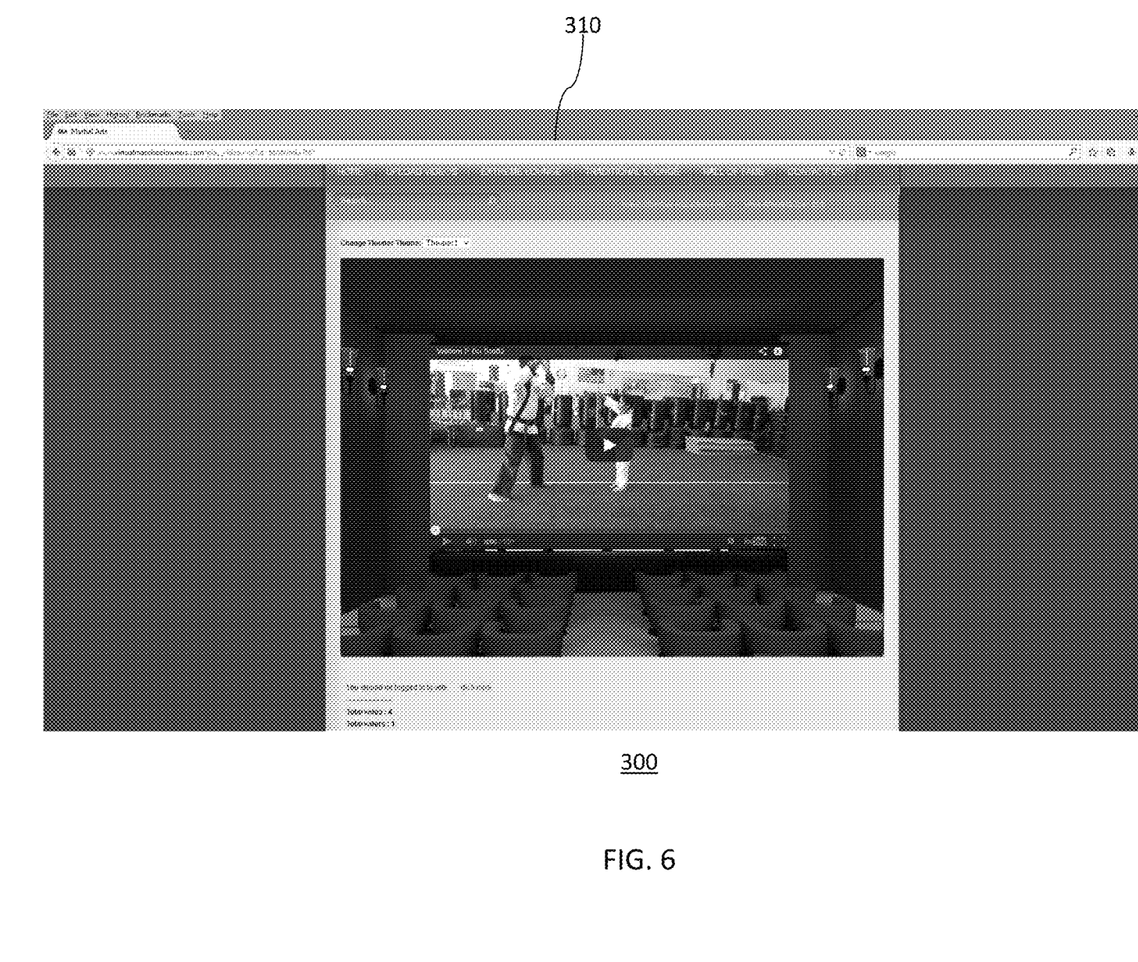
FIG. 6 is a screenshot of the exemplary website of FIG. 3, illustrating a competition video entry being displayed in a background resembling a theater, in accordance with the present invention.

In one embodiment, the video competition entries are displayed via the virtual competition website 300 within a graphical background resembling a three-dimensional theater. As used herein, the term "three-dimensional theater" is intended to indicate a physical theater, existing in the real world, as opposed to a virtual world. FIG. 6 illustrates an exemplary embodiment of a video competition entry viewing web page 310 where video competition entries can be played and viewed within a graphical background resembling a three-dimensional movie theater. In another embodiment, the video competition entries are displayed via the virtual competition website 300 with an advertisement for a sponsor. Presentation of the video competition entries within the graphical background can be paid for by the sponsor and an advertisement associated with the sponsor can be presented on the web page 310 while the video is played, before the video is played, and/or after the video is played and viewed by the video viewer. The website 300 can be configured to allow the brick-and-mortar entity 212 to view all video competition entries submitted by skill entrants 216 associated with the brick-and-mortar entity 212, continuously, within a predetermined time period. Accordingly, the brick-and-mortar entity 212 can invite its skill entrants 216 to a viewing party, where all such entries can be viewed within the theater-resembling graphical background to add a sense of occasion and provide sponsors with an advertising opportunity. Skill entrants 216 can invite friends and family members to the viewing party, increasing the audience and potential reach of the sponsored advertisement. Conducting viewing parties at the physical location of the brick-and-mortar entity 212, such as a class room in a school, is much more cost efficient and convenient than attending competitions at remotely located physical competition sites. Students and parents are accustomed to traveling to and from the school, such that attending a viewing party at the school would certainly be less of an inconvenience. Winning virtual competition entries can be revealed or announced at such viewing parties, creating an additional incentive for students to practice and submit quality performances.

In step 112, the method includes requesting that the video viewer 218 communicate the video viewer's identification information in order for the video viewer 218 to communicate an entry selection input indicating the video viewer's preference for one of the plurality of video competition entries to be a winning video competition entry. In one embodiment, the virtual competition website server 210 is operably configured to require that the video viewer 218 input predetermined identification information via the website 300, before allowing the video viewer 218 to view the video competition entry, or submit an entry selection, i.e., a vote for a preferred video competition entry. The video viewer 218 can communicate an entry selection input by, for example, clicking a button or a check box on the website 300 associated with the selected video competition entry to indicate a vote for the selected video competition entry.

In step 114, the virtual competition website server 210 can receive the entry selection input from the video viewer 218, after receiving the video viewer identification information. In one embodiment, the video viewer identification information includes a first and a last name, an email address, a telephone number, and a physical address. Such video viewer identification information is saved on the database associated with the virtual competition website server 210, to be used to generate a list of potential student leads for the brick-and-mortar entity in accordance with embodiments of the present invention. In some embodiments, the entry selection inputs are stored in the database, as well. In one embodiment, the virtual competition website server 210 is configured to keep track of each entry selection input and corresponding video competition entry for calculating the scores to determine the winning video competition entry.

In step 116, a value representing the total views received by each of the plurality of video competition entries is determined. In one embodiment, the virtual competition website server 210 keeps track of how many views are received for each of the video competition entries. In step 118, the winning video competition entry is determined. In one embodiment, the winning video competition entry is determined by comparing the total views and the total entry selection inputs received from video viewers 218 for each of the video competition entries. In one embodiment, a single view is counted when a video stream is called up by a client computer (e.g. the video viewer clicks play on his computer to play the video via the website 30) and the video stream is served by the server computer at which the videos are stored, e.g. the server 210. In an alternative embodiment, a single view is counted when the entire video is streamed for the video viewer. In one embodiment, the winning video competition entry is determined by adding, for each of the video competition entries: the value representing the total views received, and the entry selection inputs received from video viewers 218. The winning video competition entry would be the entry that received the highest total score from total views and votes. In yet another embodiment, each of the entry selection inputs are weighted more than each of the total views received for calculating a score that determines the winning video competition entry. For example, in one embodiment, each view is equal to one-half of an entry selection input. This provides a further incentive for video viewers to input identification information so that their preferred video competition entry can receive a more weighted point value towards the score. For example, each view can add a one-half point to the skill entrant's score, whereas each entry selection input adds one entire point to the skill entrant's score. In yet another embodiment, the website 300 includes a back-end administrator interface for an administrator, such as a school owner, fundraiser organizer, or coach, to login and to selectively choose a method of determining a winning video competition. The administrator can, for example, select an option to allow one or more judges to collectively determine the winning video competition, in addition to, or instead of a voting-viewing system, as explained above. In one embodiment, the administrator can select the judges and the judges can be, for example, one or more instructors associated with the brick-and-mortar entity 212.

In step 120, the video viewer identification information is communicated to the brick-and-mortar entity 212. In one embodiment, the virtual competition website server 210 includes a database that stores the video viewer identification information. When the video competition is complete, a list of video viewer identification information can be generated and mailed and/or emailed to the brick-and-mortar entity 212. In one embodiment, each brick-and-mortar entity 212 is sent video viewer identification information only for video viewers that voted for their students/members. In another embodiment, each brick-and-mortar entity 212 is sent video viewer identification information only for video viewers that have a physical address near the brick-and-mortar entity 212. This can be determined in many ways, such as, for example, determining if the video viewer and the brick-and-mortar entity 212 share the same zip code or are located in the same or neighboring cities.

Figure 7:
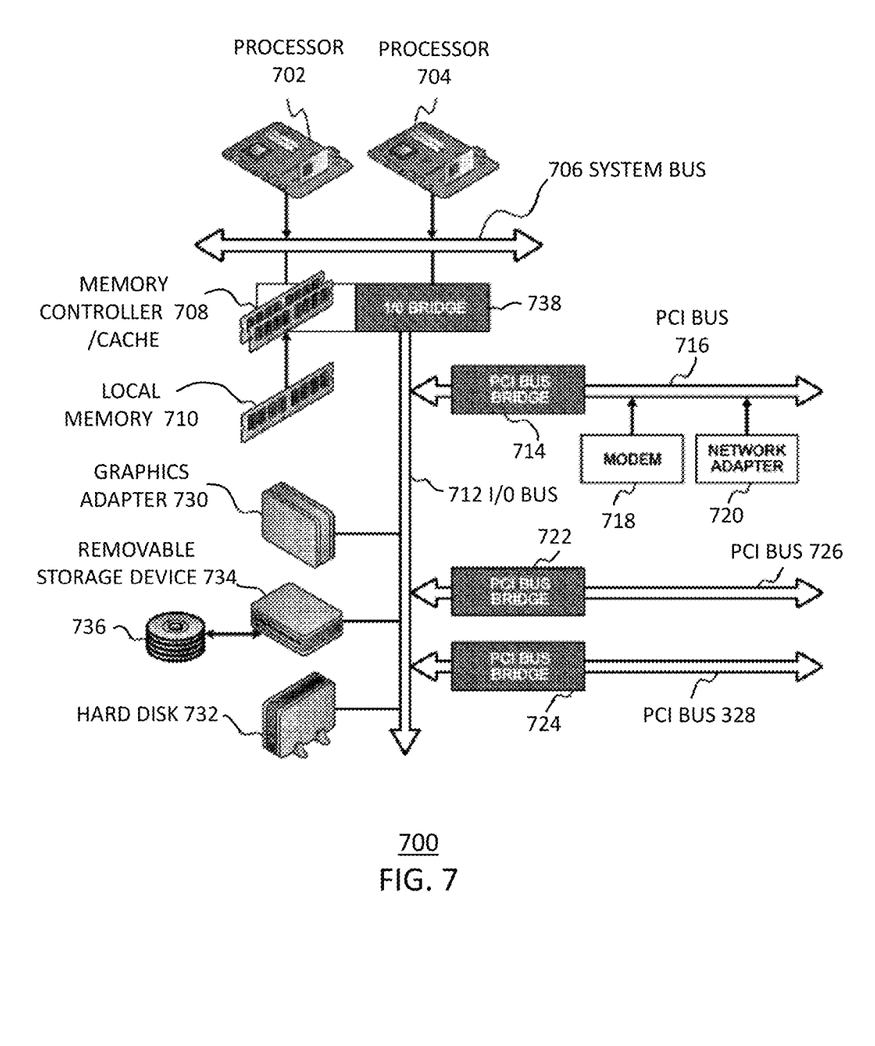
FIG. 7 is a block diagram of a data processing system that may be implemented as a network device, such as a computer server, shown in the block diagram of FIG. 2, in accordance with the present invention.

Referring now to FIG. 7, a block diagram of a data processing system 700 that may be implemented as a server, such as the virtual competition website server 210, or implemented as a personal computer or terminal/client computer, such as the computers 212*a-n*, 216*a-n*, and 218*a-n*, communicatively coupled to the server 210 via the network 214, as shown in FIG. 2, in accordance with one embodiment of the present invention. The data processing system 700 may be a symmetric multiprocessor (SMP) system including a plurality of processors 702 and 704 connected to system bus 706. Alternatively, a single processor system may be employed. Also, connected to system bus 706 is memory controller/cache 708, which provides an interface to local memory 710. An I/O bus bridge 738 is connected to system bus 706 and provides an interface to I/O bus 712. The memory controller/cache 708 and I/O bus bridge 738 may be integrated as depicted. The processor 702 or 704 in conjunction with memory controller 708 controls what data is stored in memory 710. The processor 702 and/or 704 and memory controller 708 can serve as a data counter for counting the rate of data flow to the memory 710 or from the memory 710 and can also count the total volume of data accessed to or from the memory 710. The processor 702 or 704 can also work in conjunction with any other memory device or storage location.

Peripheral component interconnect (PCI) bus bridge 714 connected to I/O bus 712 provides an interface to PCI local bus 716. A number of modems 718, or wireless cards, may be connected to PCI bus 716. Typical PCI bus implementations will support four PCI expansion slots or add-in connectors. PCI includes, but is not necessarily limited to, PCI-X and PCI Express components. Communications links to the network of computers in FIGS. 1 and 2 may be provided through the modem 718 and network adapter 720 connected to PCI local bus 716 through add-in boards.

Additional PCI bus bridges 722 and 724 provide interfaces for additional PCI buses 726 and 728, from which additional modems or network adapters may be supported. In this manner, the data processing system 700 allows connections to a multiple network of computers. A graphics adapter 730 and hard disk 732 may also be connected to I/O bus 712 as depicted, either directly or indirectly.

Those of ordinary skill in the art will appreciate that the hardware depicted in FIG. 7 may vary. For example, other peripheral devices, such as optical disk drives and the like, also may be used in addition to or in place of the hardware depicted. The depicted example is not meant to imply architectural limitations with respect to the present invention.

The process steps as explained in detail above can be embodied in a computer program. Computer programs (also called computer control logic) are stored in memory such as main memory 710, removable storage drive 734, removable media 736, hard disk 732, and signals. Such computer programs, when executed, enable the computer system to perform the features of the present invention as discussed herein. In particular, the computer programs, when executed, enable the processor 702 and/or 704 to perform the inventive process explained in detail above, and recited in the claims below.

An e-commerce solution for brick-and-mortar schools has been disclosed that provides a website operably configured to facilitate virtual video competitions, where students can submit short videos demonstrating their physical skills in a particular sport of physical skill. Winners are selected by accumulating the most views and votes, where voters are required to input identification information via the website prior to voting, which encourages students to ask family members and friends to register via the website in order to vote for their video. Brick-and-mortar schools are then provided with a list of the identification information generated during the competition from registered voters, as a potential student lead source. Additionally, entry fees are paid to the brick-and-mortar school, as an additional revenue source for the school. In this manner, competition fees can be directed away from competition hosting entities, which are typically separate from the school, and instead, be directed towards supporting the brick-and-mortar school itself.

What is claimed is:

1. A method of facilitating a virtual competition over a computer network, where the virtual competition is associated with a sport of physical skill between skill entrants associated with a brick-and-mortar school that teaches said physical skill, for providing e-commerce revenue-generating features to said brick-and-mortar school, the method comprising:

providing a virtual competition website over a computer network operably configured to facilitate a virtual competition of a sport of physical skill;

receiving a request from at least one brick-and-mortar school to participate in said virtual competition via the virtual competition website;

receiving a plurality of previously recorded video competition entries from a plurality of students associated with the at least one brick-and-mortar school, each of the plurality of video competition entries including a video demonstrating a student entrant's physical skill in the sport;

requesting that at least one video viewer communicate video viewer identification information in order for the video viewer to communicate an entry selection input indicating the at least one video viewer's preference for one of the plurality of video competition entries to be a winning video competition entry;

receiving the entry selection input from the video viewer after receiving the video viewer identification information;

determining a value representing the total views received by each of the plurality of video competition entries by adding the total number of times that each video viewer views each of the plurality of video competition entries;

determining a value representing the entry selection input from the at least video viewer;

adding, for each of the plurality of video competition entries, the value representing the total views received and the value representing the entry selection input from the at least one video viewer, wherein each of the entry selection inputs are weighted more than the total views received;

calculating, for each of the plurality of video competition entries, a score by adding of the value representing the total views received and the value representing the entry selection input;

determining the winning video competition entry by comparing the score for each of the plurality of previously recorded video competition entries;

selecting the previously recorded video competition entry with the highest score as the winning video competition entry; and communicating the video viewer identification information to the at least one brick-and-mortar entity.

2. The method in accordance with claim 1, wherein:
the sport of physical skill is martial arts.

3. The method in accordance with claim 1, further comprising:
providing instructions for students to provide an entry fee for the virtual competition to the at least one brick-and-mortar school.

4. The method in accordance with claim 1, wherein:
the virtual competition is a competition between students enrolled a single brick-and-mortar school; and
the method further comprises providing instructions for students to provide an entry fee for the virtual competition to the single brick-and-mortar school.

5. The method in accordance with claim 1, wherein:
the virtual competition is a competition between students enrolled in different brick-and-mortar schools, where each video competition entry represents the brick-and-mortar school in which the student entrant is enrolled.

6. The method in accordance with claim 1, further comprising:
displaying each of the plurality of video competition entries via the virtual competition website within a graphical background resembling a three-dimensional theater.

7. The method in accordance with claim 1, further comprising:
displaying at least one of the plurality of video competition entries via the virtual competition website with an advertisement for a sponsor of the video competition.

8. The method in accordance with claim 1, further comprising:
displaying each of the plurality of video competition entries via the virtual competition website within a graphical background, the graphical background:

resembling a three-dimensional theater, and
including an advertisement for a sponsor of the video competition.

9. The method in accordance with claim 1, further comprising:
providing a plurality of virtual competition events via the virtual competition website, where each of the plurality of virtual competition events is a virtual competition within a predetermined sub-category of the sport.

10. The method in accordance with claim 1, further comprising:
providing at least one avatar via the virtual competition website, the at least one avatar operable to provide a predetermined audio-video monologue configured to instruct participation in the virtual competition by at least one of:
a brick-and-mortar school;
a member, the member being a video viewer that:
communicated video viewer identification information, and
created a username and a password associated with an account;
a student entrant;
a competition judge; and
a potential sponsor.

11. A method of facilitating a virtual competition over a computer network, where the virtual competition is associated with a sport of physical skill between skill entrants associated with a brick-and-mortar entity, for providing e-commerce revenue-generating features to said brick-and-mortar entity, the method comprising:
providing a virtual competition website over a computer network operably configured to facilitate a virtual competition of a sport of physical skill;
receiving a request from at least one brick-and-mortar entity to participate in said virtual competition via the virtual competition website;
receiving a plurality of previously recorded video competition entries from a plurality of skill entrants associated with the at least one brick-and-mortar entity, each of the plurality of video competition entries including a video demonstrating a skill entrant's physical skill in the sport of physical skill;
receiving identification information associated with a video viewer;
as a result of receiving the identification information, receiving an entry selection input from a video viewer, the entry selection input indicating the video viewer's preference for one of the plurality of video competition entries to be a winning video competition entry;
determining a value representing the total views received by each of the plurality of video competition entries by adding the total number of times that each video viewer views each of the plurality of video competition entries;
determining a value representing the entry selection input from the at least video viewer;
adding, for each of the plurality of video competition entries, the value representing the total views received and the value representing the entry selection input from the video viewer, wherein each of the entry selection inputs are weighted more than the total views received;
calculating, for each of the plurality of video competition entries, a score by adding of the value representing the total views received and the value representing the entry selection input;

determining the winning video competition entry by comparing the score for each of the plurality of previously recorded video competition entries; and
selecting the previously recorded video competition entry with the highest score as the winning video competition entry.

12. The method in accordance with claim 11, wherein:
the sport of physical skill is martial arts.

13. The method in accordance with claim 11, further comprising:
providing instructions for skill entrants associated with the at least one-brick-and-mortar entity to provide an entry fee for the virtual competition to the at least one brick-and-mortar entity as an e-commerce revenue-generating feature for the at least one brick-and-mortar entity.

14. A method of providing an e-commerce business over a computer network to an organization associated with a physical skill, the method comprising:
providing a virtual competition website over a computer network operably configured to facilitate a virtual competition of a sport of physical skill;
receiving a request from at least one organization associated with the sport of physical skill to participate in an e-commerce business by allowing skill entrants associated with the at least one organization to enter the virtual competition;
receiving a plurality of previously recorded video competition entries from the skill entrants associated with the at least one organization, each of the plurality of video competition entries including video demonstrating a skill entrant's physical skill in the sport;
providing instructions for the skill entrants associated with the at least one organization to provide an entry fee for the virtual competition to the at least one brick-and-mortar entity;
requesting that at least one video viewer communicate video viewer identification information in order for the video viewer to communicate an entry selection input indicating the at least one video viewer's preference for one of the plurality of video competition entries to be a winning video competition entry;
receiving the entry selection input from the video viewer after receiving the video viewer identification information;
providing a back-end administrator interface associated with the virtual competition website, the back-end administrator interface allowing an administrator to selectively choose a method of determining the winning video competition;
determining a value representing the total views received by each of the plurality of video competition entries by adding the total number of times that each video viewer views each of the plurality of video competition entries;
determining a value representing the entry selection input from the at least video viewer;
adding, for each of the plurality of video competition entries, the value representing the total views received and the value representing the entry selection input from the at least one video viewer, wherein each of the entry selection inputs are weighted more than the total views received;
calculating, for each of the plurality of video competition entries, a score by adding of the value representing the total views received and the value representing the entry selection input;

determining the winning video competition entry by comparing the score for each of the plurality of previously recorded video competition entries; and selecting the previously recorded video competition entry with the highest score as the winning video competition entry.

15. The method in accordance with claim 14, further comprising:

receiving entry fee payments from the skill entrants over the computer network; and transferring at least a portion of the entry fee payments to the at least one organization associated with the skill entrants.

\* \* \* \* \*